(12) United States Patent
Uraguchi et al.

(10) Patent No.: US 9,587,787 B2
(45) Date of Patent: Mar. 7, 2017

(54) SUPPORT STRUCTURE OF SHIP TANK, AND LIQUEFIED GAS CARRIER

(71) Applicant: KAWASAKI JUKOGYO KABUSHIKI KAISHA, Kobe-shi, Hyogo (JP)

(72) Inventors: Ryosuke Uraguchi, Akashi (JP); Takumi Yoshida, Kobe (JP); Asako Murakami, Kobe (JP); Naruyoshi Izumi, Kobe (JP); Kentaro Okumura, Kakogawa (JP); Osamu Muragishi, Kakogawa (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 14/786,588

(22) PCT Filed: Apr. 21, 2014

(86) PCT No.: PCT/JP2014/002221
§ 371 (c)(1),
(2) Date: Oct. 23, 2015

(87) PCT Pub. No.: WO2014/174819
PCT Pub. Date: Oct. 30, 2014

(65) Prior Publication Data
US 2016/0069516 A1  Mar. 10, 2016

(30) Foreign Application Priority Data
Apr. 23, 2013 (JP) .................................. 2013-090097

(51) Int. Cl.
*B63B 25/08* (2006.01)
*B63B 3/08* (2006.01)
(Continued)

(52) U.S. Cl.
CPC ............ *F17C 13/082* (2013.01); *B63B 25/08* (2013.01); *B63B 25/16* (2013.01); *F17C 3/025* (2013.01);
(Continued)

(58) Field of Classification Search
CPC ......... B63B 25/00; B63B 25/08; B63B 25/02; B63B 2025/00; B63B 2025/025;
(Continued)

(56) References Cited

U.S. PATENT DOCUMENTS 2,706,575 A    4/1955  Soherr
3,677,021 A *  7/1972  Bognaes ................ B63B 25/12
                                                       114/74 A
(Continued)

FOREIGN PATENT DOCUMENTS

CN    201177156 Y    1/2009
CN    103032673 A    4/2013
(Continued)

OTHER PUBLICATIONS

Jul. 22, 2014 International Search Report issued in International Patent Application No. PCT/JP2014/002221.
(Continued)

*Primary Examiner* — Daniel V Venne
(74) *Attorney, Agent, or Firm* — Oliff PLC (57) ABSTRACT

A support structure of a ship tank includes: a curved surface facing an outer peripheral surface of a horizontal type cylindrical tank; and a pair of support units supporting the tank on the curved surface. Each of the support units includes: a plurality of cylindrical elements arranged in a circumferential direction of the tank such that an axial direction of each of the cylindrical elements coincides with a radial direction of the tank; a plurality of inner members each holding an end portion of a corresponding one of the
(Continued)

cylindrical elements at the tank side; and a plurality of outer members each holding an end portion of a corresponding one of the cylindrical elements at an opposite side to the tank. The inner members are fixed to the tank. The outer members of one of the support units are configured such that displacement of the outer members in an axial direction of the tank relative to the curved surface is restricted. The outer members of the other one of the support units are configured to be slidable on the curved surface in the axial direction of the tank.

13 Claims, 8 Drawing Sheets

(51) Int. Cl.
  *B63B 9/00* (2006.01)
  *B63B 9/04* (2006.01)
  *F17C 13/08* (2006.01)
  *B63B 25/16* (2006.01)
  *F17C 3/02* (2006.01)

(52) U.S. Cl.
  CPC ............... *F17C 2201/0104* (2013.01); *F17C 2201/0109* (2013.01); *F17C 2201/035* (2013.01); *F17C 2201/052* (2013.01); *F17C 2201/054* (2013.01); *F17C 2203/013* (2013.01); *F17C 2203/014* (2013.01); *F17C 2203/0304* (2013.01); *F17C 2203/0391* (2013.01); *F17C 2203/0629* (2013.01); *F17C 2205/0103* (2013.01); *F17C 2205/018* (2013.01); *F17C 2221/012* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2260/011* (2013.01); *F17C 2260/031* (2013.01); *F17C 2270/0105* (2013.01); *Y02E 60/321* (2013.01)

(58) Field of Classification Search
  CPC .......... B63B 2025/027; B63B 2025/08; B63B 2025/087; B63B 25/16; F17C 13/082; F17C 2201/0104; F17C 2203/013; F17C 2205/0103; F17C 2221/033; F17C 2270/0105; F17C 2260/031; F17C 2203/014; F17C 2203/0304; F17C 2203/0391; F17C 2203/0629; F17C 2205/018; F17C 2221/012; F17C 2221/035; F17C 2223/0153; F17C 2223/0161; F17C 2223/033; F17C 2260/011; F17C 3/025; F17C 2201/0109; F17C 2201/025; F17C 2201/052; F17C 2201/054; Y02E 60/321
  USPC ............ 114/72, 73, 74 R, 74 T, 74 A, 75, 83
  See application file for complete search history.

(56) References Cited

U.S. PATENT DOCUMENTS

| 3,841,269 | A | * | 10/1974 | Urruela | B63B 25/12 |
| | | | | | 114/74 R |
| RE29,424 | E | * | 10/1977 | Bognaes | B63B 25/12 |
| | | | | | 114/74 A |
| 4,345,861 | A | | 8/1982 | Aarseth | |
| 8,245,658 | B2 | | 8/2012 | Holland et al. | |
| 2009/0145909 | A1 | | 6/2009 | Hausberger | |
| 2011/0192339 | A1 | * | 8/2011 | Chen | B63B 3/70 |
| | | | | | 114/74 A |

FOREIGN PATENT DOCUMENTS

| DE | 102006018639 A1 | 10/2007 |
|---|---|---|
| DE | 202013101162 U1 | 3/2013 |
| JP | S60-245899 A | 12/1985 |
| JP | H06-159593 A | 6/1994 |
| JP | 2003-240198 A | 8/2003 |
| JP | 3708055 B2 | 10/2005 |
| JP | 2008-164066 A | 7/2008 |
| JP | 2013-053674 A | 3/2013 |
| JP | 2014-074452 A | 4/2014 |
| KR | 1983-0001088 A | 4/1983 |
| KR | 1983-0001295 B1 | 7/1983 |
| KR | 2012-0105308 A | 9/2012 |
| KR | 2013-0001844 A | 1/2013 |

OTHER PUBLICATIONS

Jul. 27, 2016 Office Action issued in Chinese Patent Application No. 201480021758.1 with English translation of Search Report.
Jun. 24, 2014 International Search Report issued in International Patent Applicaton No. PCT/JP2014/002222.
Jun. 24, 2014 Writtten Opinion issued in International Patent Application No. PCT/JP2014/002222.
U.S. Appl. No. 14/786,731, filed Oct. 23, 2015 in the name of Uraguchi et al.
Apr. 25, 2016 Office Action issued in Chinese Patent Application No. 201480021749.2.
Sep. 13, 2016 Office Action issued in U.S. Appl. No. 14/786,731.
Nov. 22, 2016 Search Report issued in European Patent Application No. 14787872.2.
Nov. 22, 2016 Search Report issued in European Patent Application No. 14787957.1.

* cited by examiner

SUPPORT STRUCTURE OF SHIP TANK, AND LIQUEFIED GAS CARRIER

TECHNICAL FIELD

The present invention relates to a support structure of a tank mounted on a ship and storing a liquefied gas, and to a liquefied gas carrier including the support structure.

BACKGROUND ART

Tanks in various shapes are used in liquefied gas carriers for marine transportation of a liquefied gas. Among these tanks, there is a case where a horizontal type cylindrical tank is supported by a pair of saddles spaced apart from each other in the axial direction of the tank. Each saddle has an arc-shaped supporting surface extending along the outer peripheral surface of the tank so that even when the ship oscillates (in a case where the axial direction of the tank coincides with the ship length direction, even when the ship rolls), the saddles can receive the load of the tank including the contents therein.

For example, Patent Literature 1 discloses a support structure of a tank, in which support units are interposed between the tank and supporting surfaces of respective saddles. Each support unit includes: a reinforcing plate joined to the outer peripheral surface of the tank; partition walls arranged on the reinforcing plate in the circumferential direction of the tank; a pair of holding plates disposed on both sides of the partition walls; and block-shaped thermal-insulating liners fitted in respective rectangular spaces surrounded by the partition walls and the holding plates, the thermal-insulating liners being in contact with the supporting surface of the saddle. The tank, other than its portions supported by the supports units, is covered with a thermal-insulating material.

Since a liquefied gas to be stored in the tank is a low-temperature gas, when the liquefied gas is fed into the tank, thermal contraction of the tank occurs. The thermal-insulating liners in the support structure disclosed in Patent Literature 1 are divided up in the circumferential direction of the tank so that a reduction in the diameter of the tank (i.e., deformation of the tank in its radial direction) due to the thermal contraction can be accommodated. Cuts are made in both ends of each thermal-insulating liner in the circumferential direction. The cuts in adjoining thermal-insulating liners form a groove, which is open toward the supporting surface of the saddle. A flexible thermal-insulating material is disposed in the groove.

Patent Literature 1 gives a description implying that when a reduction in the length of the tank (i.e., deformation of the tank in its axial direction) occurs due to thermal contraction, displacement of one of the support units in the axial direction of the tank is restricted while the other support unit is allowed to slide. This is based on the following technical feature: since the thermal-insulating liners are block-shaped, the thermal-insulating liners can follow the tank and are thereby displaceable in the axial direction of the tank without requiring any special measures.

CITATION LIST

Patent Literature

PTL1: Japanese Patent No. 3708055

SUMMARY OF INVENTION

Technical Problem

In the case of a support unit as disclosed in Patent Literature 1 in which block-shaped thermal-insulating liners are used, there is a risk that a large amount of heat enters the tank from the outside via the thermal-insulating liners. In order to suppress evaporation of the liquefied gas during the transportation, it is desirable that heat transfer by the support unit be reduced. For example, it is conceivable to form a hollow support unit with a small cross-sectional area in order to reduce a heat transfer area. However, in the case of such a hollow support unit, the issue is what structure should to be adopted so that the support unit can bear the load of the tank when the ship oscillates and so that the support unit can be displaced in the axial direction of the tank when a reduction in the length of the tank occurs due to thermal contraction.

In view of the above, an object of the present invention is to provide a support structure of a ship tank including hollow support units capable of bearing the oscillation of a ship and accommodating a reduction in the length of the tank due to thermal contraction, and to provide a liquefied gas carrier including the support structure.

Solution to Problem

In order to solve the above-described problems, a support structure of a ship tank according to the present invention is a support structure of a horizontal type cylindrical tank mounted on a ship and storing a liquefied gas. The support structure includes: a curved surface facing an outer peripheral surface of the tank; and a pair of support units supporting the tank on the curved surface and spaced apart from each other in an axial direction of the tank. Each of the pair of support units includes: a plurality of cylindrical elements arranged in a circumferential direction of the tank such that an axial direction of each of the cylindrical elements coincides with a radial direction of the tank; a plurality of inner members each holding, on the outer peripheral surface of the tank, an end portion of a corresponding one of the cylindrical elements at the tank side; and a plurality of outer members each holding, on the curved surface, an end portion of a corresponding one of the cylindrical elements at an opposite side to the tank. The inner members are fixed to the tank. The outer members of a first support unit, which is one of the pair of support units, are configured such that displacement of the outer members in the axial direction of the tank relative to the curved surface is restricted. The outer members of a second support unit, which is the other one of the pair of support units, are configured to be slidable on the curved surface in the axial direction of the tank.

The "circumferential direction of the tank" herein means a direction around the center of the tank on a plane perpendicular to the axial direction of the tank. The "radial direction of the tank" herein means a direction extending radially from the center of the tank on the plane perpendicular to the axial direction of the tank.

According to the above configuration, the cylindrical elements arranged in the circumferential direction of the tank and the inner and outer members sandwiching the cylindrical elements form a hollow load-transmitting structure extending in the circumferential direction of the tank. Since the axial direction of each cylindrical element coincides with the radial direction of the tank, even when the ship oscillates, the support units can disperse the load of the tank including the contents therein as mainly compressive force in the axial direction of each cylindrical element, thereby bearing the load of the tank. Further, the inner members are fixed to the tank, and displacement of the outer members of one of the support units in the axial direction of the tank is restricted while the outer members of the other support unit are allowed to slide in the axial direction of the tank. This makes it possible to accommodate a reduction in the length of the tank due to thermal contraction.

A gap may be formed between each pair of adjoining outer members among the outer members of the second support unit, the gap allowing each outer member to move in the circumferential direction of the tank. This configuration makes it possible to allow the outer members in the sliding-side second support unit to move together with the cylindrical elements when a reduction in the diameter of the tank occurs due to thermal contraction.

A gap may be formed between each pair of adjoining outer members among the outer members of the first support unit, the gap allowing each outer member to move in the circumferential direction of the tank. This configuration makes it possible to allow the outer members in the fixed-side first support unit to move together with the cylindrical elements when a reduction in the diameter of the tank occurs due to thermal contraction.

A lubricating liner may be sandwiched between the curved surface and the outer members of the second support unit. According to this configuration, friction between the curved surface and the outer members can be reduced with a simple configuration. This makes it possible to prevent excessive shear force from being exerted on the cylindrical elements.

Each of the outer members may include an outer fitting portion fitted to the end portion of the corresponding cylindrical element at the opposite side to the tank. According to this configuration, the end portion of the cylindrical element at the opposite side to the tank can be held with a simple shape.

Each of the outer members may include an outer surface plate covering an opening of the corresponding cylindrical element at the opposite side to the tank, and the outer fitting portion may protrude from the outer surface plate. According to this configuration, the outer surface plate is made in contact with the curved surface by a large area, and thereby contact pressure can be made small. This makes smooth sliding of the outer members possible.

Each of the outer members may be an annular member with a groove formed therein, and the end portion of the corresponding cylindrical element at the opposite side to the tank is fitted in the groove. According to this configuration, each outer member can be formed, for example, as a single component, and thereby the number of components can be reduced.

Each of the inner members may include an inner fitting portion fitted to the end portion of the corresponding cylindrical element at the tank side. According to this configuration, the end portion of the cylindrical element at the tank side can be held with a simple shape.

For example, each of the inner members may include an inner surface plate covering an opening of the corresponding cylindrical element at the tank side, and the inner fitting portion may protrude from the inner surface plate.

Each of the inner members may be an annular member with a groove formed therein, and the end portion of the corresponding cylindrical element at the tank side is fitted in the groove. According to this configuration, each inner member can be formed, for example, as a single component, and thereby the number of components can be reduced.

Each of the cylindrical elements may be made of glass fiber reinforced plastic. According to this configuration, heat transfer via the cylindrical elements can be reduced significantly compared to a case where each of the cylindrical elements is made of a metal.

The curved surface may be an inner peripheral surface of an outer shell, the outer shell encapsulating the tank such that a vacuum space is formed between the tank and the outer shell. According to this configuration, the vacuum space between the tank and the outer shell makes it possible to keep the liquefied gas at low temperatures for a long period of time.

The present invention also provides a liquefied gas carrier including the above-described support structure of a ship tank.

Advantageous Effects of Invention

The present invention makes it possible to provide a support structure of a ship tank including hollow support units capable of bearing the oscillation of a ship and accommodating a reduction in the length of the tank due to thermal contraction.

DESCRIPTION OF EMBODIMENTS

Figure 1:
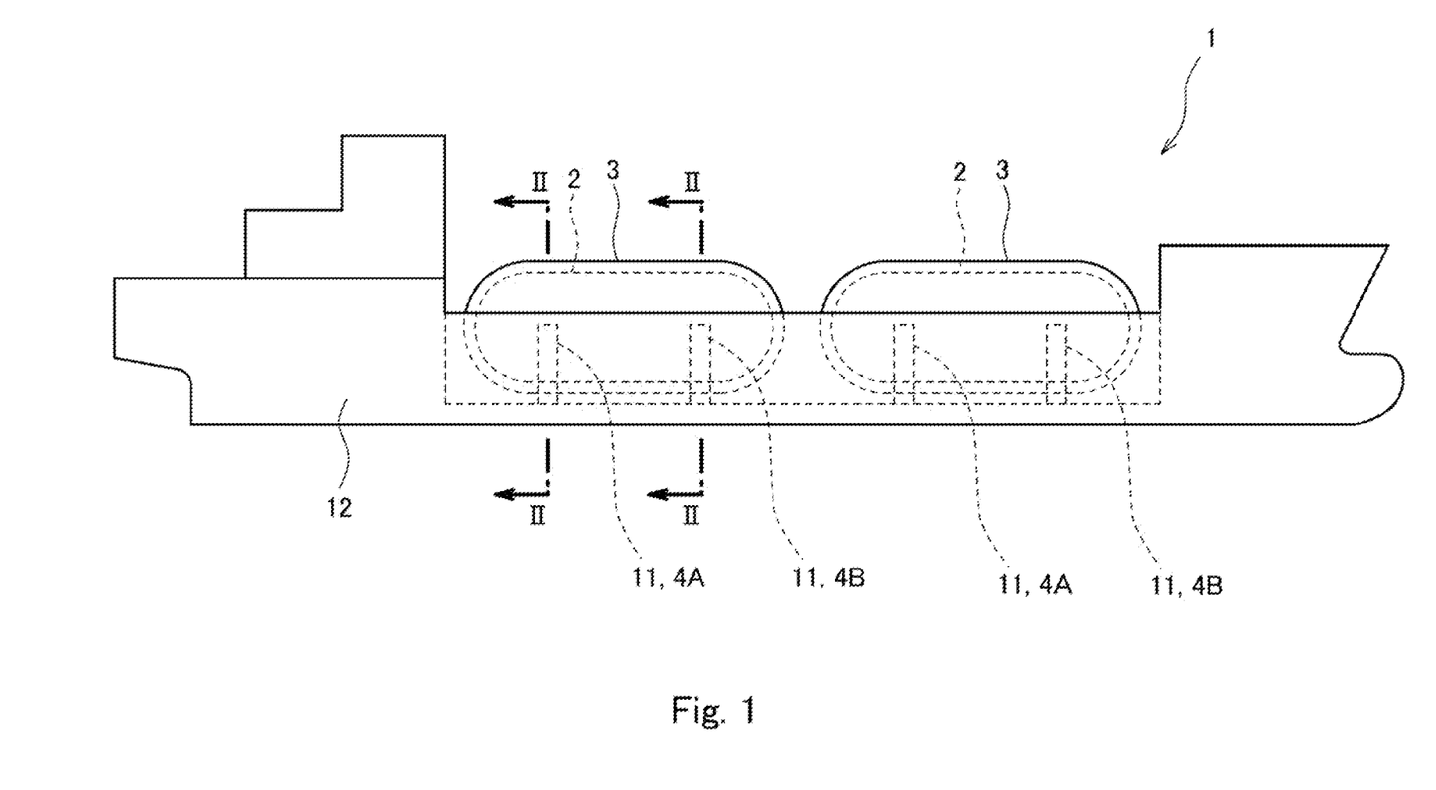
FIG. 1 is a side view of a liquefied gas carrier adopting a support structure of a ship tank according to one embodiment of the present invention.
Figure 2:
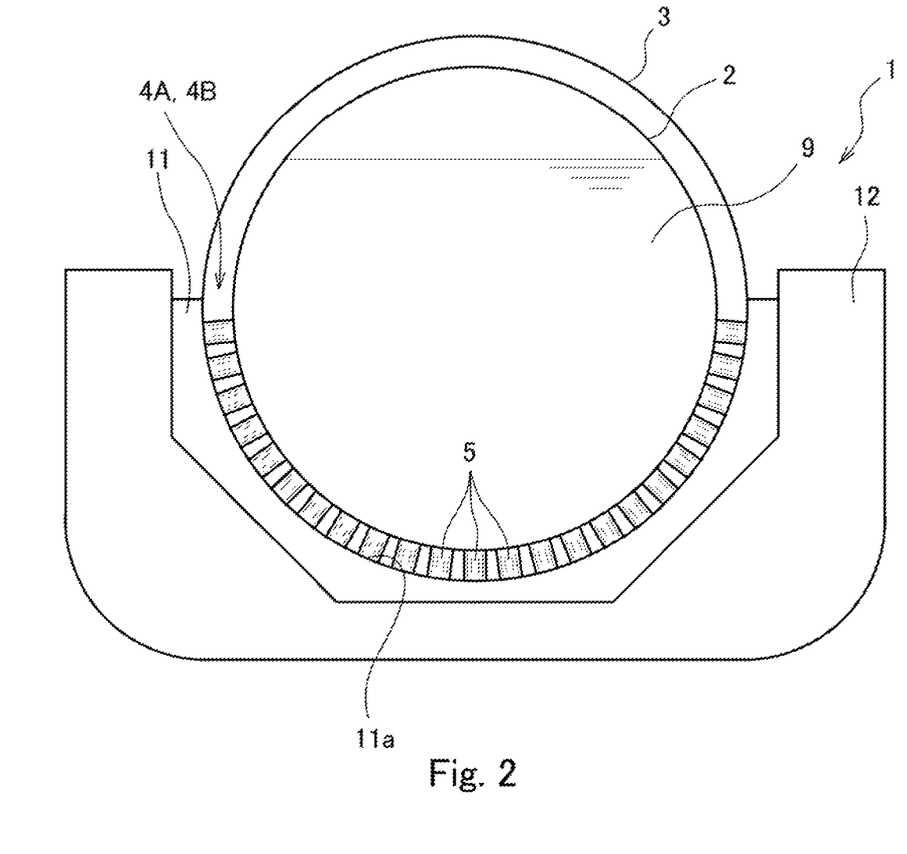
FIG. 2 is a sectional view taken along line II-II of FIG. 1.

FIG. 1 and FIG. 2 show a liquefied gas carrier 1, which adopts a support structure of a ship tank according to one embodiment of the present invention. In the present embodiment, two horizontal type cylindrical tanks 2, which are mounted on the liquefied gas carrier 1, are arranged side by side in the ship length direction. Each of the tanks 2 is encapsulated in an outer shell 3. In other words, each tank 2 and its outer shell 3 form a double shell.

Each tank 2 serves to store a liquefied gas 9. For example, the liquefied gas 9 is liquefied petroleum gas (LPG, about −45° C.), liquefied ethylene gas (LEG, about −100° C.), liquefied natural gas (LNG, about −160° C.), or liquefied hydrogen (LH$_2$, about −250° C.).

Each tank 2 includes: a body portion extending in a transverse direction (ship length direction) with a constant cross-sectional shape; and hemispherical sealing portions sealing openings on both sides of the body portion. It should be noted that, alternatively, each sealing portion may have a flat shape parallel to the vertical direction, or may be dish-shaped. The outer shell 3 has such a shape that a space with a constant thickness is formed around the tank 2. In the present embodiment, the space between the outer shell 3 and the tank 2 is a vacuum space. However, as an alternative, the space between the outer shell 3 and the tank 2 may have an atmospheric pressure, and the space may be filled with a thermal-insulating material.

In a hull 12 of the liquefied gas carrier 1, a pair of saddles 11 spaced apart from each other in the axial direction of the tank 2 is provided for each tank 2. The pair of saddles 11 supports the body portion of the tank 2 via the outer shell 3 and support units 4A and 4B. The support units 4A and 4B will be described below.

Each saddle 11 includes a supporting surface 11a, which makes surface contact with the outer peripheral surface of the outer shell 3. In the present embodiment, when seen in the axial direction of the tank 2, the supporting surface 11a extends from right below the bottom of the outer shell 3 to both sides such that the supporting surface 11a extends by substantially 90 degrees to each side. In other words, the supporting surface 11a forms a semicircular recess, in which substantially the half of the outer shell 3 is fitted.

A pair of support units 4A and 4B spaced apart from each other in the axial direction of the tank 2 is disposed between the outer shell 3 and the tank 2. The positions where the pair of support units 4A and 4B is disposed coincide with the positions where the pair of saddles 11 is disposed.

The inner peripheral surface of the outer shell 3 faces the outer peripheral surface of the tank 2, and corresponds to a curved surface of the present invention. Each support unit (4A or 4B) supports the tank 2 on the inner peripheral surface of the outer shell 3.

In the present embodiment, the support unit 4A positioned on the aft side is a fixed-side first support unit, and the support unit 4B positioned on the fore side is a sliding-side second support unit. However, as an alternative, the fixed-side first support unit 4A may be disposed on the fore side, and the sliding-side second support unit 4B may be disposed on the aft side.

Figure 3:
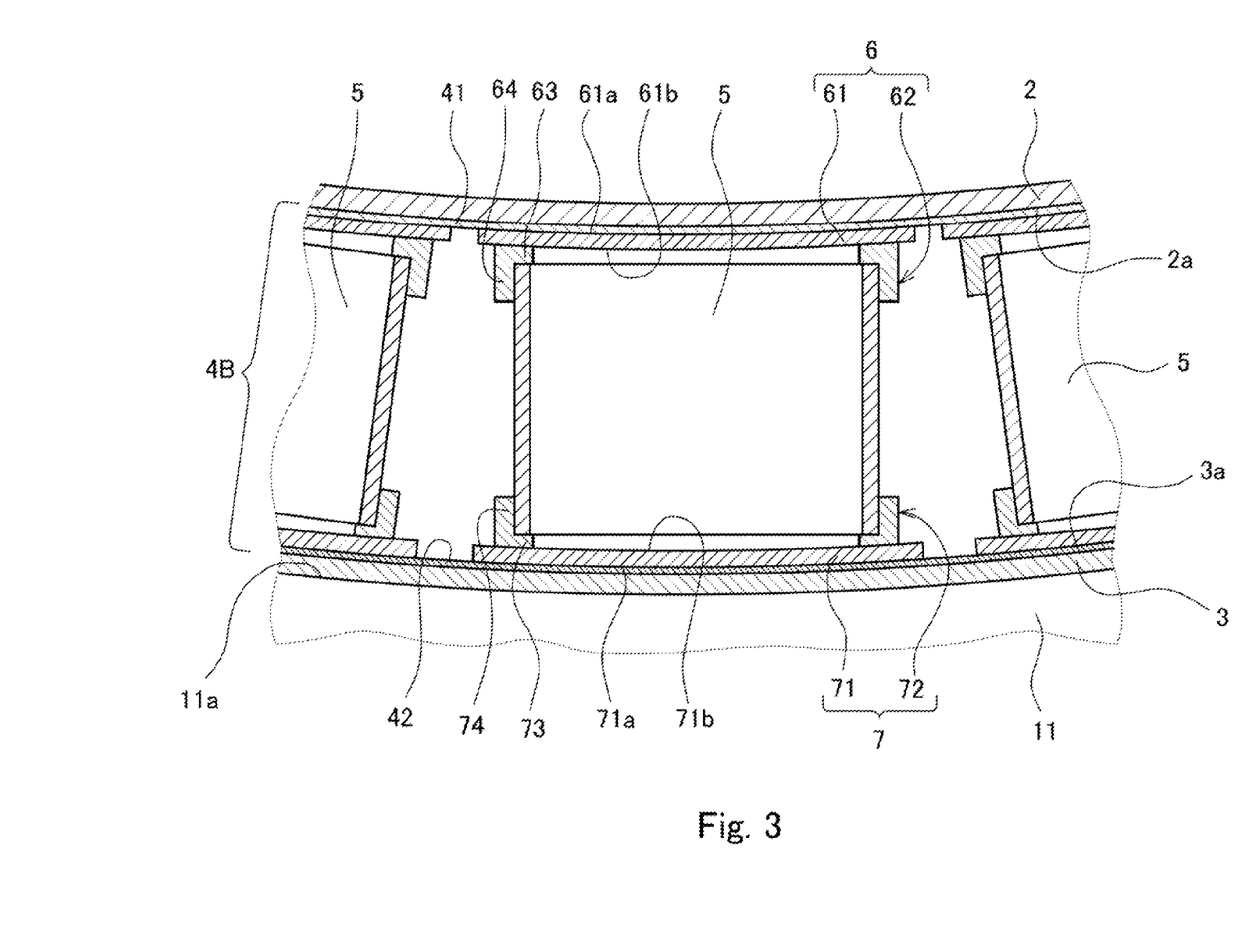
FIG. 3 is a front sectional view showing an essential part of a sliding-side second support unit.
Figure 4:
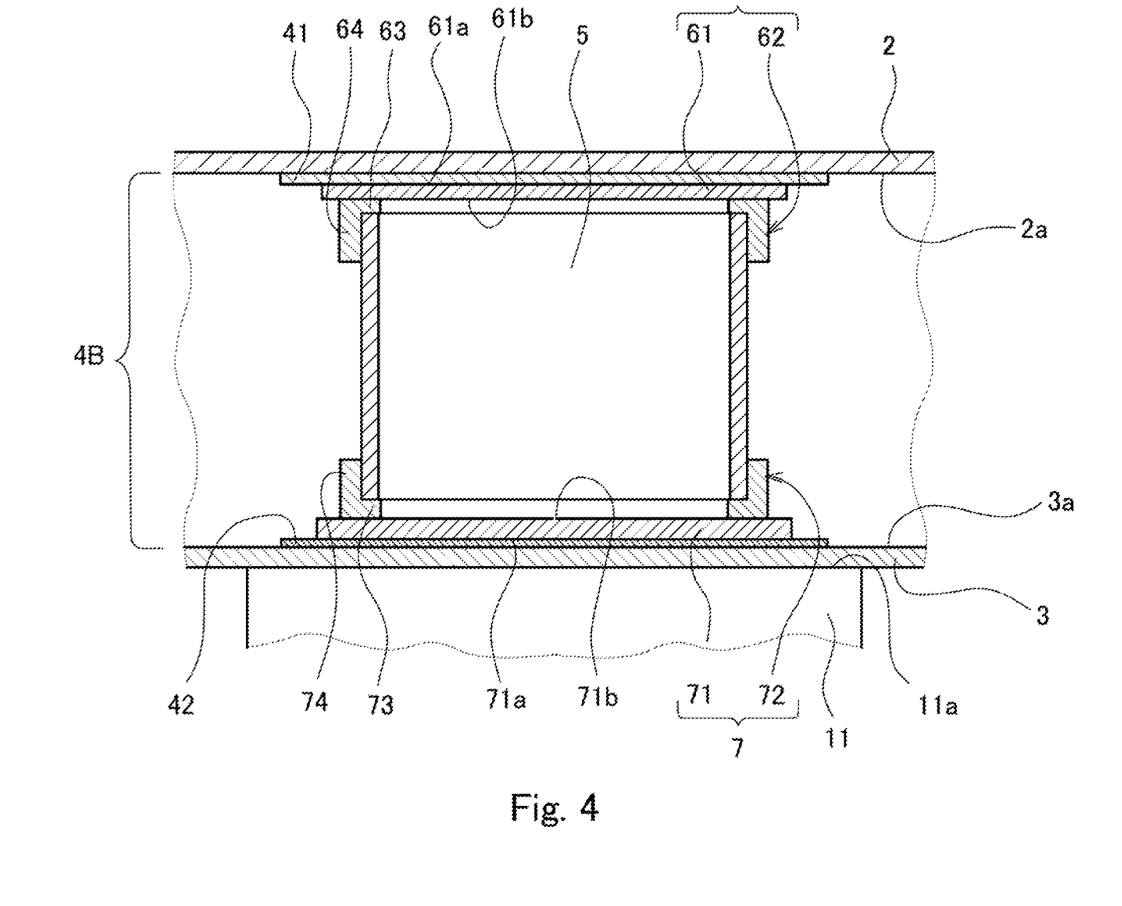
FIG. 4 is a side sectional view showing an essential part of the sliding-side second support unit.
Figure 5:
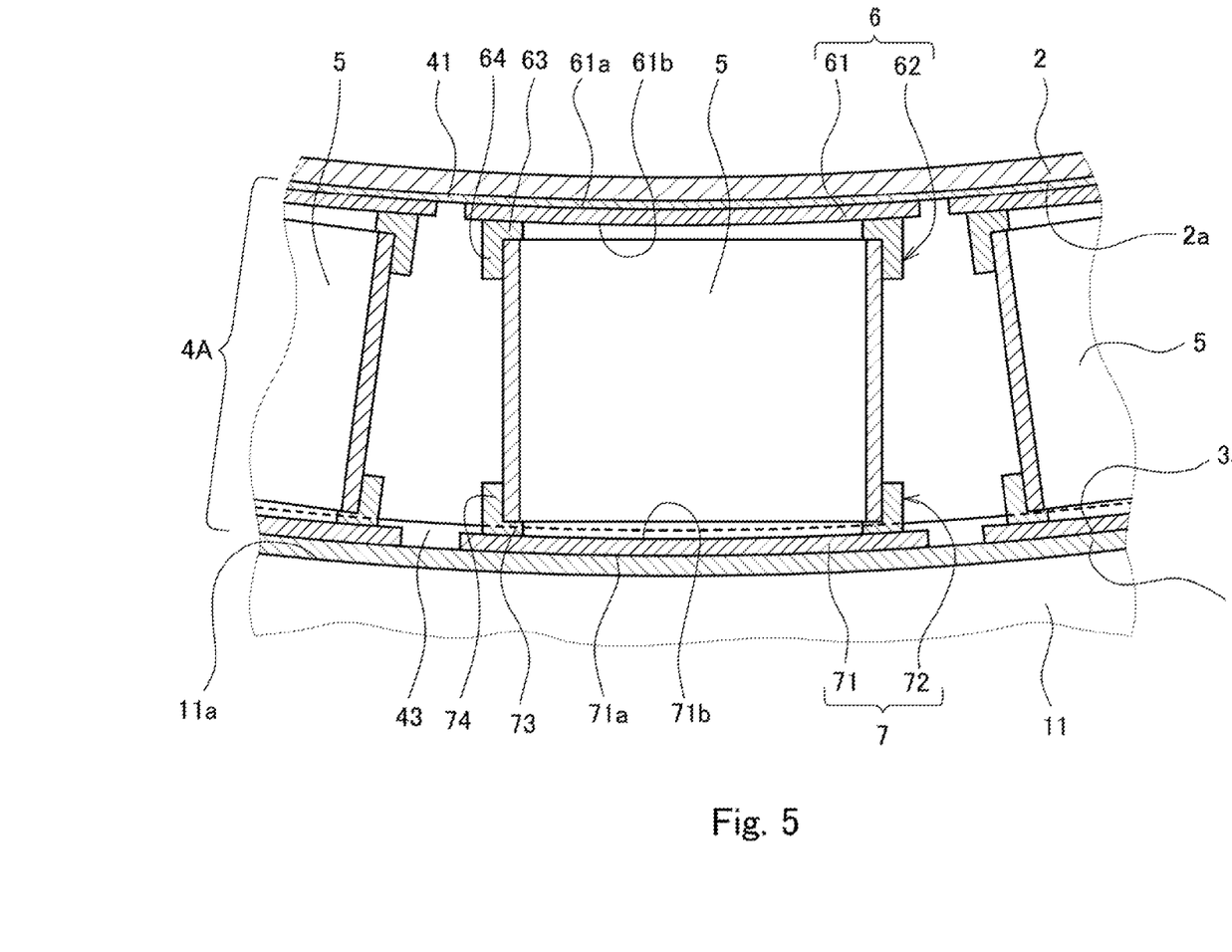
FIG. 5 is a front sectional view showing an essential part of a fixed-side first support unit.
Figure 6:
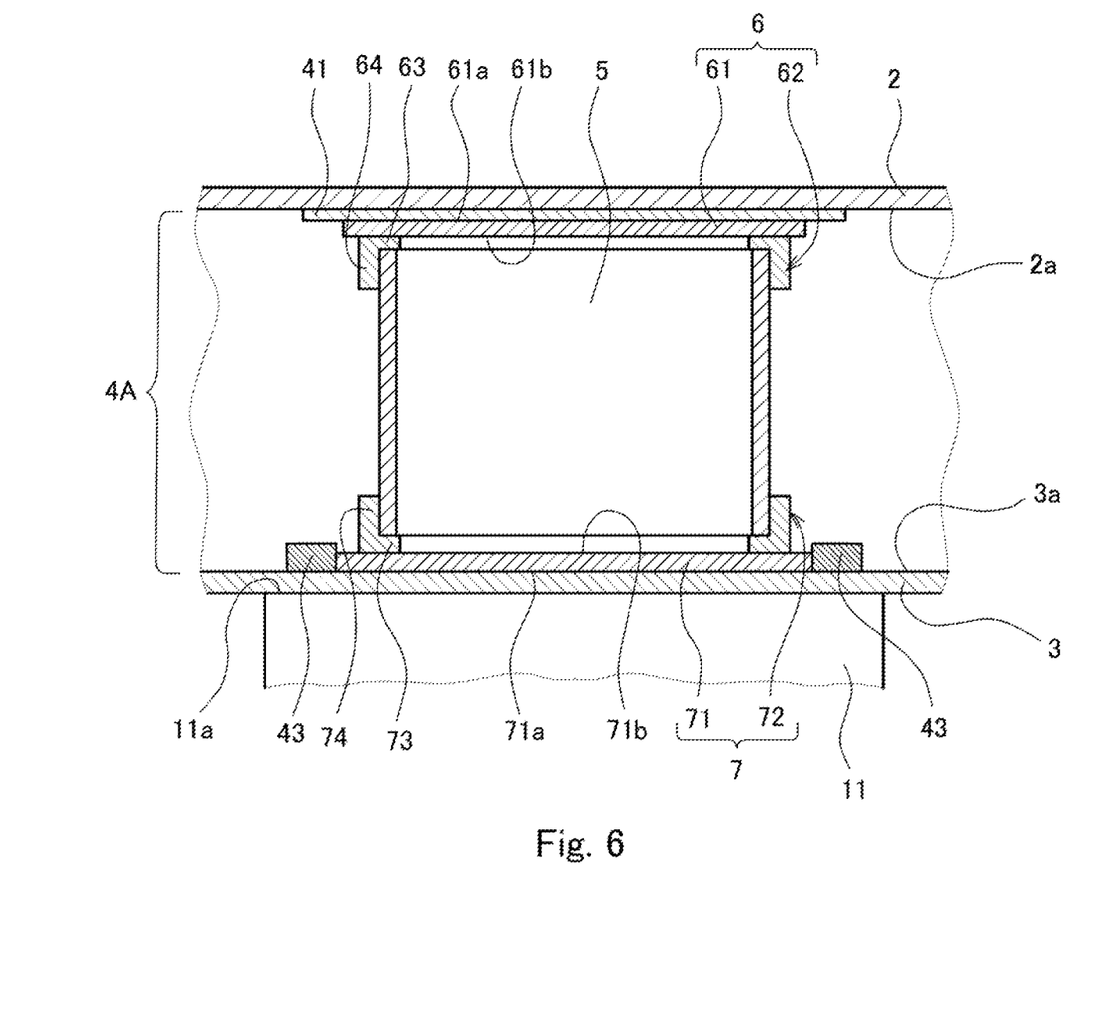
FIG. 6 is a side sectional view showing an essential part of the fixed-side first support unit.

As shown in FIG. 3 to FIG. 6, each of the first support unit 4A and the second support unit 4B includes: a plurality of cylindrical elements 5 arranged in the circumferential direction of the tank 2; a plurality of inner members 6 interposed between the tank 2 and the cylindrical elements 5; and a plurality of outer members 7 interposed between the outer shell 3 and the cylindrical elements 5. Each of the first support unit 4A and the second support unit 4B includes a belt-like reinforcing plate 41 joined to an outer peripheral surface 2a of the tank 2 and extending in the circumferential direction of the tank 2. Each support unit includes their unique component. As shown in FIG. 5 and FIG. 6, the first support unit 4A includes a pair of arc-shaped bars 43 fixed to an inner peripheral surface 3a of the outer shell 3 such that the arc-shaped bars 43 sandwich all of the outer members 7, whereas as shown in FIG. 3 and FIG. 4, the second support unit 4B includes an arc-shaped lubricating liner 42 sandwiched between the inner peripheral surface 3a of the outer shell 3 and all of the outer members 7.

The cylindrical elements 5 are disposed such that the axial direction of each cylindrical element 5 coincides with the radial direction of the tank 2. It should be noted that it is not essential that all of the cylindrical elements 5 be arranged on a single straight line extending in the circumferential direction of the tank 2. The cylindrical elements 5 may be arranged zigzag. In the present embodiment, the cross-sectional shape of each cylindrical element 5 is a circular shape. However, as an alternative, the cross-sectional shape of each cylindrical element 5 may be a polygonal shape.

In the present embodiment, each cylindrical element 5 is made of glass fiber reinforced plastic (GFRP). However, as an alternative, each cylindrical element 5 may be made of carbon fiber reinforced plastic (CFRP) or a different FRP (e.g., fabric reinforced phenolic resin), or may be made of a metal. In a case where a vacuum space is formed between the tank 2 and the outer shell 3, i.e., a vacuum double-shell structure, as in the present embodiment, it is desirable to perform plating treatment on each cylindrical element 5, such that a metal plating layer (not shown) is formed on each of the inner peripheral surface and the outer peripheral surface of each cylindrical element 5. The plating layer serves to prevent release of outgas from the GFRP cylindrical element 5 facing the vacuum space.

It should be noted that, both inside and outside the cylindrical elements 5, the outer peripheral surface 2a of the tank 2 may be covered with a thermal-insulating material (not shown) directly or via the reinforcing plate 41 and the inner members 6. The outer peripheral surface and the inner peripheral surface of the cylindrical elements 5 may also be covered with a thermal-insulating material.

On the outer peripheral surface 2a of the tank 2, each inner member 6 holds an end portion of a corresponding one of the cylindrical elements 5 at the tank 2 side. The inner members 6 are fixed by welding or the like to the outer peripheral surface 2a of the tank 2 via the reinforcing plate 41. In addition, for example, a member protruding from the reinforcing plate 41 may be provided around each inner member 6, and the inner member 6 may be fixed to the protruding member by fastening or the like.

In order to hold the cylindrical elements 5 with the inner members 6, the cylindrical elements 5 may be adhered to the inner members 6 by using an adhesive. However, in the case of a vacuum double-shell structure as in the present embodiment, there is a risk of release of outgas from the adhesive since the environment surrounding the adhesive is a vacuum environment. In the present embodiment, a fitting structure is adopted to prevent the risk.

Specifically, each inner member 6 includes: an inner surface plate 61 covering an opening of the corresponding cylindrical element 5 at the tank 2 side; and an inner fitting portion 62 protruding from the inner surface plate 61 and fitted to the end portion of the cylindrical element 5 at the tank 2 side. The inner fitting portion 62 is a different component from the inner surface plate 61, and is fixed to the inner surface plate 61 by welding or the like. However, as an alternative, the inner fitting portion 62 may be integrally formed on the inner surface plate 61. It is not essential for the inner surface plate 61 to entirely cover the opening of the cylindrical element 5 at the tank 2 side, and a large hole may be formed in the center of the inner surface plate 61. As another alternative, the inner surface plate 61 may be eliminated and the inner member 6 may only include the inner fitting portion 62. It should be noted that the cylindrical element 5 may be coupled to the inner fitting portion 62 by pins or the like from the viewpoint of work efficiency.

The inner surface plate 61 extends along the outer peripheral surface 2a of the tank 2 while keeping its constant thickness. A first main surface 61a of the inner surface plate 61 at the tank 2 side and a second main surface 61b of the inner surface plate 61 at the cylindrical element 5 side are curved surfaces whose curvature center is the same as that of the outer peripheral surface 2a of the tank 2.

The inner fitting portion 62 has an annular shape such that the end portion of the cylindrical element 5 at the tank 2 side is fitted inside the inner fitting portion 62. Specifically, the inner fitting portion 62 has an L-shaped cross section, and includes: a peripheral wall 64 overlapping the outer peripheral surface of the cylindrical element 5; and a ring portion 63 protruding radially inward from an end portion of the peripheral wall 64 at the tank 2 side and being in contact with an end surface of the cylindrical element 5.

In the present embodiment, the internal diameter of the peripheral wall 64 at normal temperatures is substantially equal to the external diameter of the cylindrical element 5. When the low-temperature liquefied gas 9 is fed into the tank 2, thermal contraction of the tank 2 occurs. Since the temperature of the inner member 6 fixed to the tank 2 also becomes low, thermal contraction of the inner member 6 occurs. If the inner fitting portion 62 is fitted to the cylindrical element 5 from the outside, then formation of a gap between the inner fitting portion 62 and the cylindrical element 5 can be prevented when thermal contraction of the inner member 6 occurs.

The ring portion 63 serves to fill the gap between the second main surface 61b, which is a curved surface of the inner surface plate 61, and the flat end surface of the cylindrical element 5. Specifically, the thickness of the ring portion 63 gradually increases in the circumferential direction of the tank 2 in accordance with an increase in the distance from the central axis of the cylindrical element 5. However, as an alternative, the inner fitting portion 62 may only include the peripheral wall 64. In this case, the end surface of the cylindrical element 5 may be formed as a curved surface. However, since forming the end surface of the cylindrical element 5, which is made of GFRP, as a curved surface is not easy, it is desirable for the inner fitting portion 62 to include the ring portion 63.

It should be noted that it is not essential for the inner members 6 to be separate from one another in the circumferential direction of the tank 2, and all the inner members 6 may be connected to one another. For example, the inner surface plates 61 of all the inner members 6 may form a single continuous plate. In this case, the reinforcing plate 41 can be eliminated.

On the inner peripheral surface 3a of the outer shell 3, each outer member 7 holds an end portion of a corresponding one of the cylindrical elements 5 at the outer shell 3 side. As shown in FIG. 6, in the fixed-side first support unit 4A, the aforementioned pair of bars 43 forms a groove on the inner peripheral surface 3a of the outer shell 3, such that the groove extends in the circumferential direction of the tank 2. The outer members 7 of the first support unit 4A are fitted in the groove and are in direct contact with the inner peripheral surface 3a of the outer shell 3. In this manner, displacement of the outer members 7 of the first support unit 4A in the axial direction of the tank 2 relative to the inner peripheral surface 3a of the outer shell 3 is restricted. It should be noted that, instead of the bars 43, blocks that restrict the displacement of the outer members 7 in the axial direction of the tank 2 may be disposed for each outer member 7.

On the other hand, as shown in FIG. 4, in the sliding-side second support unit 4B, each outer member 7 is in contact with the inner peripheral surface 3a of the outer shell 3 via the aforementioned lubricating liner 42. The lubricating liner 42 is made of a favorably slidable material (e.g., fluorine resin or molybdenum disulfide). In the axial direction of the tank 2, the width of the lubricating liner 42 is greater than the width of each outer member 7, and the lubricating liner 42 protrudes beyond both sides of each outer member 7. Accordingly, the outer members 7 of the second support unit 4B are slidable on the inner peripheral surface 3a of the outer shell 3 in the axial direction of the tank 2.

As shown in FIG. 3 and FIG. 5, in both the first support unit 4A and the second support unit 4B, a gap is formed between each pair of adjoining outer members 7. The gap allows each outer member 7 to move in the circumferential direction of the tank 2 when a reduction in the diameter of the tank 2 occurs due to thermal contraction. In the above-described first support unit 4A, no lubricating liner 42 is sandwiched between the inner peripheral surface 3a of the outer shell 3 and the outer members 7 unlike the second support unit 4B. However, as an alternative, in the first support unit 4A, the lubricating liner 42 may be sandwiched between the inner peripheral surface 3a of the outer shell 3 and the outer members 7 in a manner similar to the second support unit 4B.

Similar to the inner members 6, the outer members 7 also adopt a fitting structure from the viewpoint of avoiding the use of an adhesive. Specifically, each outer member 7 includes: an outer surface plate 71 covering an opening of the corresponding cylindrical element 5 at the outer shell 3 side; and an outer fitting portion 72 protruding from the outer surface plate 71 and fitted to an end portion of the cylindrical element 5 at the outer shell 3 side. The outer fitting portion 72 is a different component from the outer surface plate 71, and is fixed to the outer surface plate 71 by welding or the like. However, as an alternative, the outer fitting portion 72 may be integrally formed on the outer surface plate 71. It is not essential for the outer surface plate 71 to entirely cover the opening of the cylindrical element 5 at the outer shell 3 side, and a large hole may be formed in the center of the outer surface plate 71. As another alternative, the outer surface plate 71 may be eliminated and the outer member 7 may only include the outer fitting portion 72. It should be noted that the cylindrical element 5 may be coupled to the outer fitting portion 72 by pins or the like from the viewpoint of work efficiency.

The outer surface plate 71 extends along the inner peripheral surface 3a of the outer shell 3 while keeping its constant thickness. A first main surface 71a of the outer surface plate 71 at the outer shell 3 side and a second main surface 71b of the outer surface plate 71 at the cylindrical element 5 side are curved surfaces whose curvature center is the same as that of the inner peripheral surface 3a of the outer shell 3.

In the present embodiment, the outer fitting portion 72 has an annular shape such that the end portion of the cylindrical element 5 at the outer shell 3 side is fitted inside the outer fitting portion 72. However, unlike the inner members 6, a decrease in the temperature of the outer members 7 when the low-temperature liquefied gas 9 is fed into the tank 2 is small since the temperature of the outer shell 3 stays within a normal temperature range even when the low-temperature liquefied gas 9 is fed into the tank 2. Therefore, the outer fitting portion 72 may be fitted to the cylindrical element 5 from the outside as in the present embodiment, or conversely, fitted to the cylindrical element 5 from the inside.

Specifically, the outer fitting portion 72 has an L-shaped cross section, and includes: a peripheral wall 74 overlapping the outer peripheral surface of the cylindrical element 5; and a ring portion 73 protruding radially inward from an end portion of the peripheral wall 74 at the outer shell 3 side and being in contact with an end surface of the cylindrical element 5.

The ring portion 73 serves to fill the gap between the second main surface 71b, which is a curved surface of the outer surface plate 71, and the flat end surface of the cylindrical element 5. Specifically, the thickness of the ring portion 73 gradually decreases in the circumferential direction of the tank 2 in accordance with an increase in the distance from the central axis of the cylindrical element 5. However, as an alternative, the outer fitting portion 72 may only include the peripheral wall 74. In this case, the end surface of the cylindrical element 5 may be formed as a curved surface. However, since forming the end surface of the cylindrical element 5, which is made of GFRP, as a curved surface is not easy, it is desirable for the outer fitting portion 72 to include the ring portion 73.

As described above, in the support structure of the tank according to the present embodiment, the cylindrical elements 5 arranged in the circumferential direction of the tank 2 and the inner and outer members 6 and 7 sandwiching the cylindrical elements 5 form a hollow load-transmitting structure extending in the circumferential direction of the tank 2. Since the axial direction of each cylindrical element 5 coincides with the radial direction of the tank 2, the load of the tank 2 including the contents therein is dispersed as compressive force in the axial direction of each cylindrical element 5 regardless of the orientation of the ship. Therefore, each of the first support unit 4A and the second support unit 4B can bear the load of the tank 2 even when the ship oscillates. Further, the inner members 6 are fixed to the tank 2, and displacement of the outer members 7 of the first support unit 4A in the axial direction of the tank 2 is restricted while the outer members 7 of the second support unit 4B are allowed to slide in the axial direction of the tank 2. This makes it possible to accommodate a reduction in the length of the tank 2 due to thermal contraction.

In both the first support unit 4A and the second support unit 4B, a gap is formed between each pair of adjoining outer members 7, the gap allowing each outer member 7 to move in the circumferential direction of the tank 2. This makes it possible to allow the outer members 7 to move together with the cylindrical elements 5 when a reduction in the diameter of the tank 2 occurs due to thermal contraction.

Further, in the present embodiment, since each outer member 7 includes the outer fitting portion 72, the end portion of each cylindrical element 5 at the outer shell 3 side can be held with a simple shape. Since each outer member 7 also includes the outer surface plate 71, the outer surface plate 71 is made in contact with the inner peripheral surface 3a of the outer shell 3 by a large area, and thereby contact pressure can be made small. This makes smooth sliding of the outer members 7 possible.

Similarly, since each inner member 6 includes the inner fitting portion 62, the end portion of each cylindrical element 5 at the tank 2 side can be held with a simple shape.

Since each cylindrical element 5 is made of GFRP, heat transfer via the cylindrical element 5 can be reduced significantly compared to a case where each cylindrical element 5 is made of a metal. In addition, since the space formed between the tank 2 and the outer shell 3 is a vacuum space, the liquefied gas 9 can be kept at low temperatures for a long period of time.

Variation (1) Overall Support Structure

Figure 9:
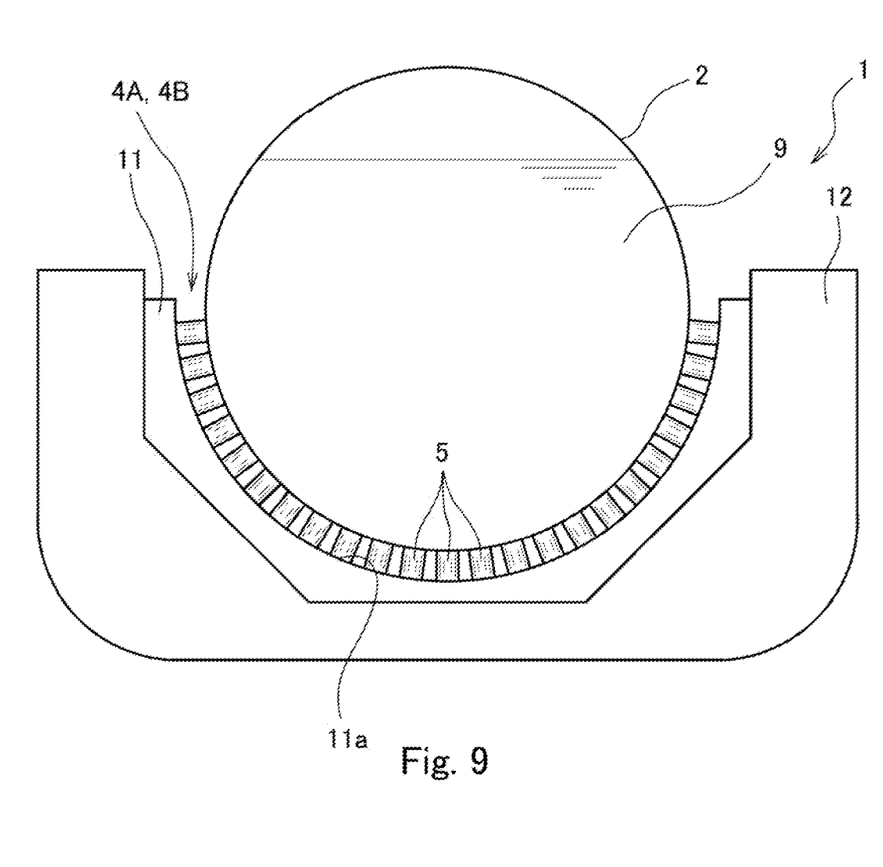
FIG. 9 is a sectional view of a liquefied gas carrier adopting a support structure of a ship tank according another embodiment.

In the above-described embodiment, the tank 2 is encapsulated in the outer shell 3. However, the outer shell 3 can be eliminated as shown in FIG. 9. In this case, the support units 4A and 4B may support the tank 2 on the supporting surfaces 11a of the saddles 11. That is, the curved surface of the present invention may be the supporting surface 11a of each saddle 11. In the case where the outer shell 3 is eliminated, it is desirable that the tank 2, other than its portions supported by the support units 4A and 4B, be covered with a thermal-insulating material.

In a case where the space between the tank 2 and the outer shell 3 has an atmospheric pressure, the inner peripheral surface and the outer peripheral surface of each cylindrical element 5, which is made of GFRP, need not be covered with a metal plating layer. In addition, in the case where the space between the tank 2 and the outer shell 3 has an atmospheric pressure, each cylindrical element 5 may be adhered to the inner member 6 and the outer member 7 by using an adhesive.

(2) Inner Member

It is not essential that the inner fitting portion 62 of the inner member 6 be fitted to the cylindrical element 5 from the outside, and the inner fitting portion 62 of the inner member 6 may be fitted to the cylindrical element 5 from the inside. For example, the inner fitting portion 62 may have a discoid shape fitted in the opening of the cylindrical element 5 at the tank 2 side. However, it is desirable that the inner fitting portion 62 be fitted to the cylindrical element 5 from the outside as described in the above embodiment from the viewpoint of preventing the formation of a gap between the inner fitting portion 62 and the cylindrical element 5 when the temperature of the inner member 6 becomes low.

As another variation, it is not essential for the inner member 6 to include the inner fitting portion 62. For example, a flange may be integrally formed on the cylindrical element 5, and the flange may be fastened to bolts protruding from the inner surface plate 61 by nuts. Alternatively, the cylindrical element 5 and the inner surface plate 61 may be fastened together by using L-shaped metal fittings.

Figure 7:
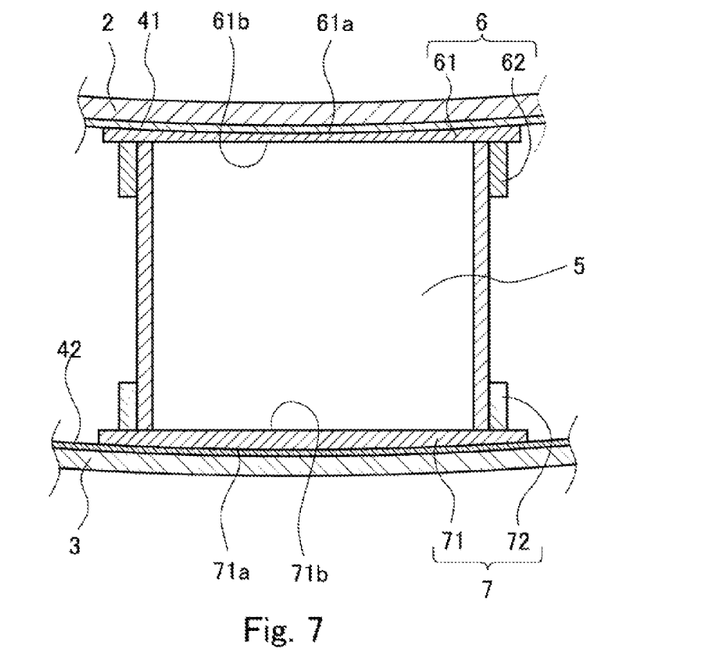
FIG. 7 is a front sectional view showing inner and outer members according to one variation.

It is not essential that the second main surface 61b of the inner surface plate 61 at the cylindrical element 5 side have a curved surface whose curvature center is the same as that of the outer peripheral surface 2a of the tank 2. As shown in FIG. 7, the second main surface 61b may be a flat surface perpendicular to the radial direction of the tank 2. According to this configuration, the shape of the inner member 6 can be made simpler.

Figure 8:
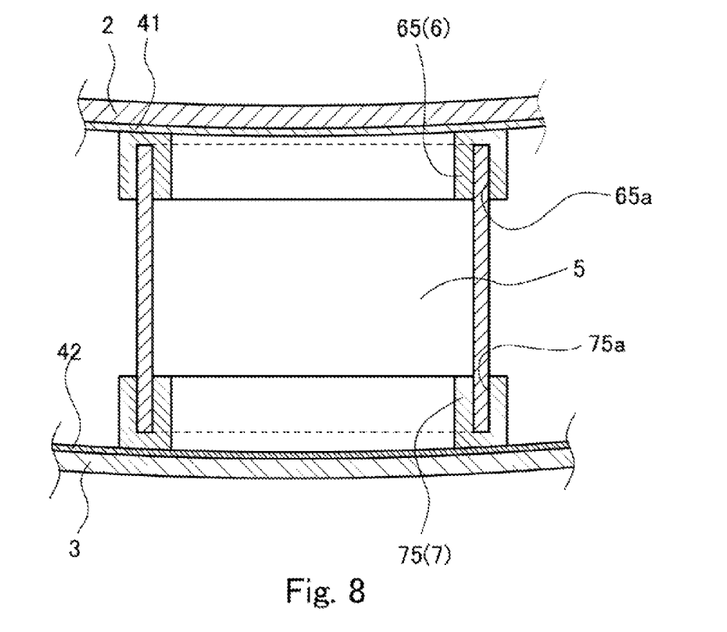
FIG. 8 is a front sectional view showing inner and outer members according to another variation.

Alternatively, as shown in FIG. 8, the inner member 6 may be an annular member 65, in which a groove 65a is formed. The end portion of the cylindrical element 5 at the tank 2 side is fitted in the groove 65a. According to this configuration, each inner member 6 can be formed as, for example, a single component, and thereby the number of components can be reduced.

(3) Outer Member

It is not essential for the outer members 7 to be separate from one another in the circumferential direction of the tank 2. All or some of the outer members 7 may be connected to one another. However, it is desirable that a gap be formed between each pair of adjoining outer members 7 of, at least, the sliding-side support unit 4B, such that each of these outer members 7 is movable not only in the axial direction of the tank 2 but also in the circumferential direction of the tank 2. This makes it possible to effectively utilize a configuration in which the outer members 7 are made slidable in the axial direction of the tank 2 (i.e., the configuration adopting the lubricating liner 42 in the above-described embodiment) while accommodating a reduction in the diameter of the tank 2.

It is not essential for the outer member 7 to include the outer fitting portion 72. For example, a flange may be integrally formed on the cylindrical element 5, and the flange may be fastened to bolts protruding from the outer surface plate 71 by nuts. Alternatively, the cylindrical element 5 and the outer surface plate 71 may be fastened together by using L-shaped metal fittings.

It is not essential that the second main surface 71b of the outer surface plate 71 at the cylindrical element 5 side have a curved surface whose curvature center is the same as that of the inner peripheral surface 3a of the outer shell 3. As shown in FIG. 7, the second main surface 71b may be a flat surface perpendicular to the radial direction of the tank 2. According to this configuration, the shape of the outer member 7 can be made simpler.

Alternatively, as shown in FIG. 8, the outer member 7 may be an annular member 75, in which a groove 75a is formed. The end portion of the cylindrical element 5 at the outer shell 3 side is fitted in the groove 75a. According to this configuration, each outer member 7 can be formed as, for example, a single component, and thereby the number of components can be reduced.

In the sliding-side second support unit 4B, it is not essential that the lubricating liner 42 be sandwiched between the inner peripheral surface 3a of the outer shell 3 and the outer members 7. For example, the outer surface plate 71 of each outer member 7 can be made of a resin with favorable sliding ability. Alternatively, in a case where the outer surface plate 71 of each outer member 7 is made of a metal, a lubricating oil may be applied onto the inner peripheral surface 3a of the outer shell 3, which is contacted by the outer surface plate 71.

However, if the lubricating liner 42 is sandwiched between the inner peripheral surface 3a of the outer shell 3 and the outer members 7 of the second support unit 4B as in the above-described embodiment, friction between the inner peripheral surface 3a of the outer shell 3 and the outer members 7 can be reduced with a simple configuration. This makes it possible to prevent excessive shear force from being exerted on the cylindrical elements 5.

INDUSTRIAL APPLICABILITY

The support structure of a ship tank according to the present invention is particularly useful when applied to a liquefied gas carrier for marine transportation of a low-temperature liquefied gas.

REFERENCE SIGNS LIST 1 liquefied gas carrier
2 tank
2a outer peripheral surface
3 outer shell
3a inner peripheral surface (curved surface)
4A first support unit
4B second support unit
42 lubricating liner
5 cylindrical element
6 inner member
61 inner surface plate
61a first main surface
61b second main surface
62 inner fitting portion
65 annular member
65a groove
7 outer member
71 outer surface plate
71a first main surface
71b second main surface
72 outer fitting portion
75 annular member
75a groove

The invention claimed is:

1. A support structure of a ship comprising:
a cylindrical tank extending horizontally, mounted on the ship, and storing a liquefied gas;
a curved surface facing an outer peripheral surface of the cylindrical tank; and
a pair of support units supporting the cylindrical tank on the curved surface and spaced apart from each other in an axial direction of the cylindrical tank, wherein
each of the pair of support units includes:
a plurality of cylindrical elements arranged in a circumferential direction of the cylindrical tank such that an axial direction of each of the cylindrical elements coincides with a radial direction of the cylindrical tank;
a plurality of inner members each holding, on the outer peripheral surface of the cylindrical tank, a first end portion, which is adjacent to the cylindrical tank, of a corresponding one of the cylindrical elements; and
a plurality of outer members each holding, on the curved surface, a second end portion, which is opposite to the first end portion, of a corresponding one of the cylindrical elements,
the plurality of inner members are fixed to the cylindrical tank,
the plurality of outer members of a first support unit, which is one of the pair of support units, are configured such that displacement of the plurality of outer members in the axial direction of the cylindrical tank relative to the curved surface is restricted, and
the plurality of outer members of a second support unit, which is the other one of the pair of support units, are configured to be slidable on the curved surface in the axial direction of the cylindrical tank.

2. The support structure of a ship according to claim 1, wherein
a gap is formed between each pair of adjoining outer members among the plurality of outer members of the second support unit, the gap allowing each outer member to move in the circumferential direction of the cylindrical tank.

3. The support structure of a ship according to claim 2, wherein
a gap is formed between each pair of adjoining outer members among the plurality of outer members of the first support unit, the gap allowing each outer member to move in the circumferential direction of the cylindrical tank.

4. The support structure of a ship tank according to claim 1, wherein
a lubricating liner is sandwiched between the curved surface and the plurality of outer members of the second support unit.

5. The support structure of a ship according to claim 1, wherein
each of the plurality of outer members includes an outer fitting portion fitted to the second end portion of the corresponding cylindrical element.

6. The support structure of a ship according to claim 5, wherein
each of the plurality of outer members includes an outer surface plate covering an outer opening, which is opposite to the outer peripheral surface of the cylindrical tank, of the corresponding cylindrical element, and
the outer fitting portion protrudes from the outer surface plate.

7. The support structure of a ship according to claim 1, wherein
each of the plurality of outer members is an annular member with a groove formed therein, and the second end portion of the corresponding cylindrical element is fitted in the groove.

8. The support structure of a ship according to claim 1, wherein
each of the plurality of inner members includes an inner fitting portion fitted to the first end portion of the corresponding cylindrical element.

9. The support structure of a ship according to claim 8, wherein
each of the plurality of inner members includes an inner surface plate covering an inner opening, which is adjacent to the tank, of the corresponding cylindrical element, and
the inner fitting portion protrudes from the inner surface plate.

10. The support structure of a ship according to claim 1, wherein
each of the plurality of inner members is an annular member with a groove formed therein, and the first end portion of the corresponding cylindrical element is fitted in the groove.

11. The support structure of a ship according to claim 1, wherein
each of the cylindrical elements is made of glass fiber reinforced plastic.

12. The support structure of a ship according to claim 1, wherein
the curved surface is an inner peripheral surface of an outer shell, the outer shell encapsulating the cylindrical tank such that a vacuum space is formed between the cylindrical tank and the outer shell.

13. A liquefied gas carrier comprising the support structure of a ship according to claim 1.

* * * * *